Oct. 27, 1931.  F. C. HASSE  1,829,592
BLOWPIPE APPARATUS
Filed June 1, 1929  2 Sheets-Sheet 2
Fig. II.
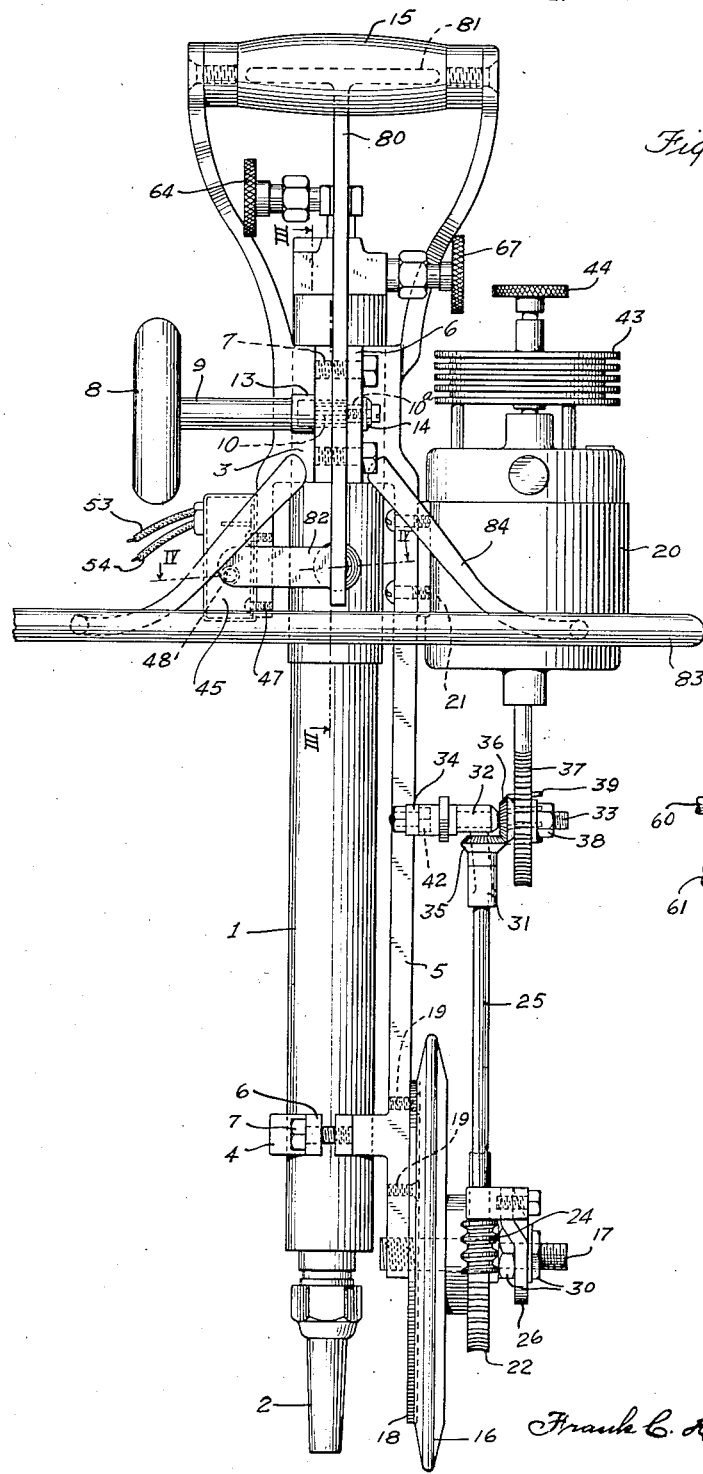
Fig. III.
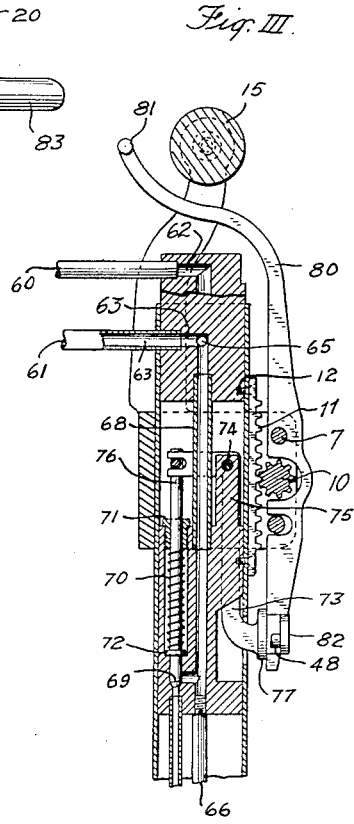
Frank C. Hasse, INVENTOR,
BY
Byrnes, Townsend & Brickenstein, ATTORNEYS.

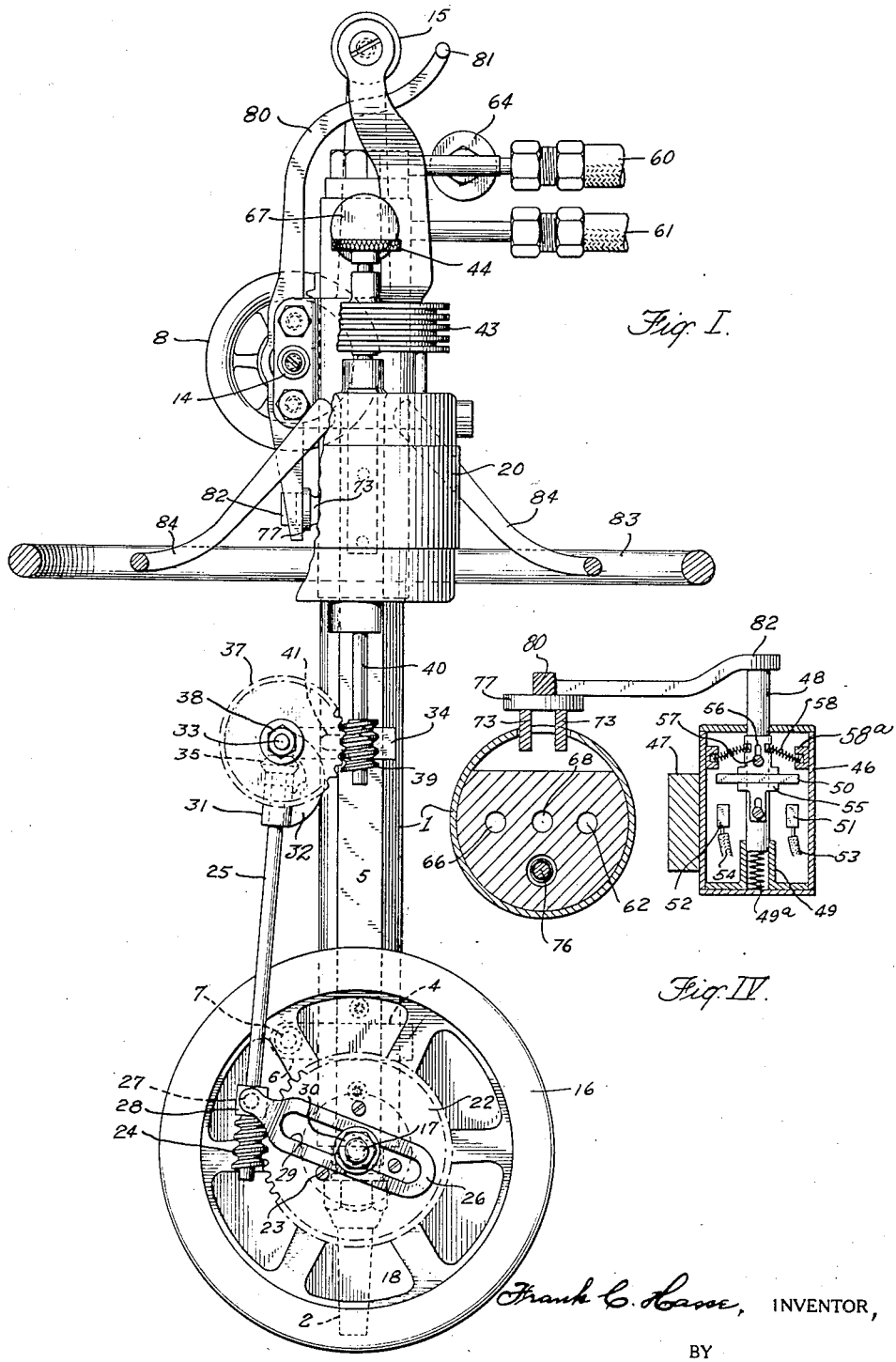

Patented Oct. 27, 1931

1,829,592

UNITED STATES PATENT OFFICE

FRANK C. HASSE, OF LA GRANGE, ILLINOIS, ASSIGNOR TO THE OXWELD RAILROAD SERVICE COMPANY, OF CHICAGO, ILLINOIS, A CORPORATION OF DELAWARE

BLOWPIPE APPARATUS

Application filed June 1, 1929. Serial No. 367,796.

My invention relates to a power driven portable blowpipe apparatus employing gas for cutting or welding metals and particularly to an improved means for feeding and guiding the nozzle and a unitary means for controlling the feeding means and the flow of gas to the nozzle, and also to a means for protecting against breakage the feeding, guiding and gas control means.

This invention is particularly adapted to cutting shapes from metal plates. Power driven blowpipes constructed for this purpose heretofore have been mounted on a carriage supported on two or more wheels and provided with a motor for feeding the blowpipe. Due to the plurality of wheels and the construction and arrangement of the motor and gas controls, these blowpipes have not been satisfactory for certain classes of work. They are difficult to operate in small spaces and where it is required that the metal be accurately cut or welded, without the use of templets, along curved or irregular lines.

In cutting or welding metal plates, it is important that the nozzle of the blowpipe be accurately guided and that the flame and gas jets issuing therefrom be directed upon the metal to be operated upon at a suitable angle, and that the jets be moved along the metal at a predetermined uniform rate of speed. For economy of operation in the case of cutting metals, it is desirable to turn on the cutting gas only after the metal to be cut has been heated to the proper temperature by the flame issuing from the blowpipe nozzle and simultaneously with the commencement of the feeding movement of the nozzle along the metal, and it is also desirable to turn off the cutting gas at the instant the feeding movement of the nozzle is stopped. In the type of work referred to, it is important that the blowpipe be small and portable and easily controlled, and that its nozzle be capable of being guided along irregular lines as well as straight lines without the use of templets.

Therefore, an important object of this invention is to construct a small portable motor driven blowpipe pivotally supported at one end by a single wheel, and manually supported at the other end so that the nozzle can be moved in any direction and held in a balanced condition in response to the movement of the manual support. A further object of my invention is to provide an improved means for controlling the nozzle feed and the flow of gas to the nozzle. Another object of my invention is to protect the fragile parts against breakage.

The above and other objects and novel features of this invention will appear from the following description:

Figs. I and II are, respectively, a side and a front view of the blowpipe.

Figs. III and IV are sectional views on lines III—III and IV—IV respectively in Fig. II.

A blowpipe or torch body 1 having a nozzle 2 coupled to the lower end thereof is slidably supported in two spaced split collar bearings 3, 4 attached to a frame 5. The collar bearings have lugs 6 provided with clamp screws 7 extending through one of the lugs and engaging screw threads in the opposed lug for adjusting the bearings. The torch body is movable up and down in its bearings by means of a hand wheel 8 secured to a shaft 9. The shaft has a gear 10 fixed to the end thereof, which meshes with a rack 11 secured to the torch body by screws 12. The gear 10 is secured to the hand wheel shaft 9 in a socket within an enlarged portion 13 on the hand wheel shaft 9. The gear 10 has a reduced portion 10a on its outer end which is journaled in the lug 6 of the bearing. The other end of the gear is journaled in the opposite lug. The reduced portion 10a of the gear is internally threaded to receive a screw having a head 14. The head 14 of the screw bears against the collar bearing lug 6 in which the reduced portion 10a of the gear 10 is journaled, and holds the enlarged portion 13 on the shaft 9 against the outside face of the opposite lug. This construction rotatably secures the gear and the shaft to the lugs 6 and provides a convenient means of assembling the parts.

The blowpipe is supported and guided along the work by means of a handle 15 attached to the upper end of the frame 5. The other end of the frame is supported near the nozzle 2 by means of a feeding or propelling wheel 16. The feeding wheel is journaled on an axle 17 secured to the lower end of the frame. A flat shield 18 is secured by screws 19 to the lower end of the frame between the feeding wheel and the nozzle. The shield protects the wheel and a part of its driving mechanism, now to be described, from sparks and heat produced by the metal and the flame from the nozzle.

A motor 20 for driving the feeding wheel 16 is secured to the upper end of the frame with screws 21. A detachable worm wheel 22 is secured with screws or bolts 23 to the hub of the feeding wheel in a coaxial relation thereto. A worm 24 is keyed to the lower end of a transmission shaft 25 and is held in mesh with the worm wheel by an adjustable link 26. The link is pivotally connected at one end to a lug 27 on a bearing 28 for the lower end of the shaft 25. The other end of the link has a slot 29 in it adapted to receive the threaded end of the feeding wheel axle 17. The slotted end of the link may be secured to the axle betwen two clamping nuts 30 on the threaded end thereof at any point along the slot 29. This construction provides a means for adjusting the radial distance of the worm 24 from the axis of the worm wheel 22 so that one worm wheel may be changed for another having a different diameter in order to change the feeding speed of the blowpipe.

The upper end of the transmission shaft 25 is supported in a bearing 31 of a bracket 32 pivoted on a stud 33 secured to a second bracket 34 attached to the frame 5. A bevel gear 35 is keyed to the upper end of the transmission shaft 25 and is maintained in mesh with a bevel gear 36 journaled on the stud 33 by means of the pivoted bracket 32. A worm wheel 37 coaxial with the stud 33 is keyed to the hub of the bevel gear 36 journaled on the stud. The bevel gear 36 and the worm wheel 37 attached thereto is held on the stud 33 by a nut 38 cooperating with the threaded end of the stud. A worm 39 is keyed to the motor shaft 40 and meshes with the worm wheel 37 and drives the feeding wheel 16 through the transmission just described.

The gear ratio between the worm 39 on the motor shaft and the worm wheel 37 journaled on the stud 33 may be varied by exchanging this worm wheel for another of a different diameter, and thus provide another means for changing the speed of the feeding wheel. In order to provide for the variation in the diameters of the different worm wheels that may be used, the bracket 34 carrying the stud 33 is provided with a slot 41 therein through which a bolt 42 screwed into the frame passes and clamps the bracket between the head of the bolt and the frame. The bracket may be clamped to the frame at any point along this slot and thus vary the radial distance between the stud 33 and the motor shaft 40 to accommodate worm wheels of different diameters that may be journaled on the stud.

The motor has a governor 43 to automatically control the speed of the blowpipe feed. The governor is provided with a manually adjustable screw 44 for changing its speed setting.

The motor is provided with a starter switch 45 of any usual snap acting type. In order to clearly illustrate the invention, a snap switch of a simple form is shown in Fig. IV. The switch is enclosed in a casing 46 secured to an arm 47 of the frame 5. A plunger 48 projects through the top cover of the casing. The end of the plunger within the casing fits in a socket 49 provided with a spring 49a for normally urging the plunger outwardly to the open circuit position as shown in Fig. IV. The circuit to the motor is made by a metallic bar 50 which is adapted to bridge the space between the contacts 51, 52 to which the electrical conductors 53 and 54 leading to the motor are attached. The bar is mounted on an insulating plate 55 mounted on the plunger 48. The bar and the plate have a longitudinal lost motion connection with the plunger as provided by slots 56 in the plate. Pins or screws 57 are fixed to the plunger and engage the slots. A compression spring 58 extends from a socket in each side of the plate 55 to a socket 58a on each side of the switch casing. In this structure when the pins 57 on the plunger carry the spring sockets in the insulating plate downwardly past the line of the sockets 58a, the bar 50 is snapped by the springs into contact with the contacts 51 and 52 to complete the motor circuit, and when the pins 57 on the plunger carry the spring sockets in the insulating plate upwardly past the line of the sockets 58a, the bar 50 is snapped out of contact with the contacts 51 and 52 to break the motor circuit.

The blowpipe herein shown is adapted particularly for cutting metals. It is supplied with a fuel gas such as acetylene through a conduit 60 and it is supplied with a combustion supporting and cutting gas such as oxygen through another conduit 61 both of which are connected to the head of the torch body 1. The conduits 60 and 61 are respectively connected to passages 62 and 63 in the torch body as shown in Fig. III. The fuel gas passage 62 extends lengthwise of the torch body 1 and enters a mixing chamber of the usual form in the lower end of the torch body near the nozzle 2. A valve operated by a valve knob 64 controls the flow of fuel gas in this passage to the nozzle. The oxygen conducting passage is divided into two branches 66, 68 at the valve seat 65. One of the branch passages 66 extends through the body of the torch to the mixing chamber where it is mingled with the fuel gas prior to being delivered to the torch nozzle. The flow of oxygen in this passage is controlled by a valve cooperating with the valve seat 65 and operated by a valve knob 67 located within convenient reach of the operator on the upper end of the torch body near the guiding handle 15.

The other branch oxygen passage 68 supplies oxygen to the cutting gas jet in the nozzle 2. A valve 69 is placed in this passage for controlling the flow of oxygen to the jet. The valve is normally maintained in a closed position by a spring 70 compressed between a fixed bushing 71 and a shoulder 72 on the valve stem 76. The valve may be moved away from its seat by means of a bell crank lever 73 pivoted on a pin 74 on an arm 75 fixed to the torch body. One end of the lever is pivotally connected to the valve stem 76 and the other end of the lever projects through the valve body and has an exposed button 77 which may be pressed to operate the valve 69.

A lever 80 is provided for simultaneously controlling the movement of the cutting oxygen valve 69 and the motor switch 45. The lever is pivoted intermediate its end on the clamp screw 7 on the upper end of the frame 5. One end of the lever has an operating handle 81 located in convenient reach of the operator's hand when it is on the guiding handle 15. The other end of the lever is adapted to rest upon the cutting oxygen valve button 77, and it also has a lateral projection 82 which is adapted to rest upon the switch plunger 48.

A guard rail 83 surrounds the frame and is rigidly connected thereto by means of arms 84. The guard rail surrounds the motor and extends laterally from the frame beyond all of the blowpipe controls so as to protect them against breakage that may result from impact of the blowpipe with other objects. The guard rail also provides a rest for the blowpipe when it is not in use.

In operating the blowpipe it is lighted and the gas mixture for the flame is adjusted in the usual manner. The operator may then grasp the guiding and supporting handle 15, and balance the lower end of the blowpipe on the feeding wheel 16 so that the wheel will be in an upright position on the metal to be cut. The handle is elevated until the flame issuing from the nozzle strikes the work at the desired angle. The nozzle elevating hand wheel 8 is then turned until the end of the nozzle 2 is adjusted to the desired distance from the work. The flame is played upon the line on the work to be cut until the metal is heated up to the temperature that is required to cause a jet of oxygen to combine with the heated metal and thereby cut it. When the desired temperature is reached the operator pulls the lever handle 81 towards the guiding and supporting handle 15 with his thumb or fingers of one or both hands which may be grasping the latter handle. The movement of the lever handle oscillates the lever 80 about the clamp bolt 7 and the lower end of the lever is forced against the valve button 77 and the switch plunger 48 to simultaneously turn on the cutting gas and to start the motor. The torch nozzle 2 is driven at the proper uniform speed over the metal to be cut by the motor driving mechanism as the flame heats the metal and the oxygen jet cuts it. The nozzle may be firmly and accurately guided along the line to be cut by the operator's hand on the guiding and supporting handle 15, without the aid of a templet.

Due to the portability, the adjustability and ease of control of this apparatus, it has a wide range of uses for cutting shapes of irregular, or regular outline, and it is especially adapted to cut or weld large pieces of work where speed and accuracy is required, and where this work is performed in the field.

Bevel edges may be cut with my apparatus by holding the axis of the feeding wheel inclined to the plate or the axis of the feeding wheel may be held parallel to the plate and a nozzle having gas passages inclined to the axis of the torch may be used to replace the usual nozzle having gas passages parallel to the axis of the torch body.

While the apparatus illustrated in the drawings comprises a blowpipe adapted for cutting metals, I do not wish to be limited to a cutting apparatus alone, as my invention may be readily used for welding by substituting a welding torch body and nozzle for the cutting torch body and nozzle illustrated, and other changes and modifications may be made within the scope of my invention.

I claim:

1. In a portable blowpipe apparatus, the combination of a frame; a means for supporting said apparatus upon the work at one point only comprising a wheel journalled on one end of the frame whereby the apparatus may travel along the surface of the work; a handle at the other end of the frame for guiding and carrying the apparatus; and a blowpipe mounted on and extending lengthwise of said frame.

2. In a portable blowpipe apparatus according to claim 1, wherein said blowpipe and said wheel are mounted on opposite sides of said frame, in combination with means for adjusting said blowpipe lengthwise of said frame.

3. In a portable power-driven blowpipe apparatus, the combination of a frame, a blowpipe mounted on and extending lengthwise of said frame; means for supplying gas to said blowpipe; valve means for controlling such gas supplying means; a wheel journalled on the lower end of said frame whereby the apparatus may be propelled along the surface of the work; an electric motor mounted on said frame and connected to said wheel to drive the same; a switch for controlling the circuit of said motor; a handle secured to the other end of the frame for guiding and carrying the apparatus; and means associated with said handle operable to actuate such controlling means and said switch.

4. A portable blowpipe apparatus comprising a frame, a blowpipe body supported by said frame, a nozzle attached to one end of said body, means for supplying gas to said nozzle, means comprising a single wheel for pivotally supporting said frame at the nozzle end for pivotal movement in any direction, and manual means for carrying the opposite end of the frame and for controlling said pivotal movements.

5. A portable blowpipe apparatus comprising a frame, a blowpipe body supported by said frame, a nozzle attached to one end of said body, means for supplying gas to said nozzle, means for pivotally supporting said frame at the nozzle end for pivotal movement in any direction, power means attached to the frame for propelling said apparatus, and manual means at the end of said frame opposite to the nozzle for supporting said frame and for controlling the movements of the nozzle.

6. A portable blowpipe apparatus as in claim 5, including a guard extending outwardly from said frame for protecting said controls and power driving means.

7. A portable blowpipe apparatus comprising a frame, a blowpipe body adjustably supported by said frame and having gas passages extending therethrough, a nozzle attached to one end of said body, means for longitudinally adjusting said body relatively to said frame, means for controlling the flow of gas in said gas passages, means for manually carrying the end of the frame opposite the nozzle and for controlling the direction of movement of the nozzle, means for supporting the other end of the frame and for propelling said apparatus, power means for driving said propelling means, and means for controlling said power means.

8. A portable blowpipe apparatus as in claim 7, including a guard rail extending around said frame and attached thereto for protecting all of said controls and said power driving means.

9. In a motor driven manually controlled blowpipe apparatus, the combination of a blowpipe, a handle for manually supporting one end of said apparatus, motor driven means for supporting the other end, means adjacent to said handle and operable by the operator's hand on said handle for simultaneously operating the motor starting means and a separate means for controlling the supply of gas to the blowpipe nozzle.

10. In a motor driven manually controlled cutting torch apparatus, a torch body having a nozzle on one end thereof and having separate gas conducting passages therethrough for conducting a supply of combustible gas and a supply of oxygen to the torch nozzle, a motor driven means for supporting the nozzle end of said apparatus, a handle for manually supporting the other end of said apparatus, and means adjacent to said handle and operable by the operator's hand on said handle for simultaneously operating the starting means for said motor driven means and a separate means for opening said oxygen conducting passage.

11. A cutting torch apparatus comprising a frame, a guiding handle attached to one end of said frame, a single wheel journalled on the other end of the frame for supporting and propelling the apparatus, a motor mounted on said frame for driving said wheel, a means for starting and stopping said motor, a torch body having a cutting gas passage therethrough supported by said frame and longitudinally adjustable thereof, a valve independent of said motor starting and stopping means for controlling a supply of gas to said passage, and a means for simultaneously controlling said motor starting means and said valve.

12. A cutting torch apparatus as in claim 11, said control means for said motor starting means and valve comprising a lever pivoted intermediate its ends on said frame; one end of said lever extending in proximity to said guiding handle and adapted to be operated by the operator's hand on the guiding handle, the other end of said lever extending to said motor starting means and said valve.

13. In a portable blowpipe apparatus, a means for supporting the nozzle end of a blowpipe and for propelling said apparatus comprising a wheel journalled on the nozzle end of said apparatus, a gear coaxial with said wheel and detachably secured thereto, a second gear in mesh with the first gear, a motor for driving said second gear, a means for adjusting said second gear radially from the axis of the first gear, comprising a pivotal gear driving connection between the motor and the second gear, a radially adjustable bearing for said second gear, an adjustable link connected to the bearing for maintaining said second gear in mesh with said first gear.

14. In a portable blowpipe apparatus, a power feeding mechanism, comprising a propelling wheel, a motor for driving said wheel, a transmission mechanism between said motor and said wheel, comprising a motor shaft, a gear on said shaft, a second gear in mesh with the first gear and journalled in a bracket radially adjustable from the first gear, and a driving connection between said second gear and said propelling wheel.

15. In a blowpipe apparatus, a motor and a feeding wheel driven by said motor, a power transmitting mechanism for transmitting power between said motor and said wheel, comprising a gear driven by said motor, a power transmitting shaft, a bearing for said shaft at one end thereof and supported pivotally on the axis of said gear, a second gear fixed to the end of said shaft and in mesh with said first gear, a changeable driving connection between the other end of said shaft and said wheel.

16. A blowpipe apparatus as in claim 15 in which said driving connection comprises a gear fixed to said power transmitting shaft, a gear in mesh with said latter gear and coaxial with said wheel and fixed thereto.

In testimony whereof, I affix my signature.

FRANK C. HASSE.